US011308682B2

(12) United States Patent
Croxford et al.

(10) Patent No.: US 11,308,682 B2
(45) Date of Patent: Apr. 19, 2022

(54) DYNAMIC STEREOSCOPIC RENDERING METHOD AND PROCESSOR

(71) Applicants: Apical Limited, Cambridge (GB); Arm Limited, Cambridge (GB)

(72) Inventors: Daren Croxford, Swaffham Prior (GB); Mathieu Jean Joseph Robart, Papworth Everard (GB)

(73) Assignees: Apical Limited, Cambridge (GB); Arm Limited, Cambridge (GB)

(*) Notice: Subject to any disclaimer, the term of this patent is extended or adjusted under 35 U.S.C. 154(b) by 0 days.

(21) Appl. No.: 16/665,924

(22) Filed: Oct. 28, 2019

(65) Prior Publication Data

US 2021/0125395 A1 Apr. 29, 2021

(51) Int. Cl.
*G06T 15/06* (2011.01)
*G06F 3/01* (2006.01)
*G06T 15/20* (2011.01)

(52) U.S. Cl.
CPC .............. *G06T 15/06* (2013.01); *G06F 3/013* (2013.01); *G06T 15/20* (2013.01); *G06T 2210/21* (2013.01)

(58) Field of Classification Search
None
See application file for complete search history.

(56) References Cited

U.S. PATENT DOCUMENTS

| 8,564,641 | B1* | 10/2013 | Levin | H04N 13/246 |
| | | | | 348/42 |
| 2001/0048507 | A1* | 12/2001 | Thomas | G06T 15/00 |
| | | | | 353/10 |
| 2007/0035829 | A1* | 2/2007 | Woodgate | G02B 3/0037 |
| | | | | 359/462 |
| 2010/0309296 | A1* | 12/2010 | Harrold | G02B 30/27 |
| | | | | 348/54 |
| 2013/0293547 | A1* | 11/2013 | Du | H04N 13/111 |
| | | | | 345/426 |
| 2018/0084232 | A1* | 3/2018 | Belenkii | H04N 13/324 |
| 2018/0190006 | A1* | 7/2018 | Overbeck | G06T 15/06 |

(Continued)

OTHER PUBLICATIONS

Siekawa et al. "Foveated Ray Tracking for VR Headsets" (Year: 2019).*

(Continued)

*Primary Examiner* — Hilina K Demeter
(74) *Attorney, Agent, or Firm* — EIP US LLP

(57) ABSTRACT

A method comprising the steps of generating a first representation and a second representation, where the first representation represents a first view of a computer-generated scene obtained from a first virtual camera and the second representation represents a second view of the computer-generated scene obtained from a second virtual camera. Each of the first and second representation comprises a plurality of rays which intersect with objects of the scene. A relationship is determined between a ray of the first representation and a ray of the second representation; which are grouped based on the relationship, to form a group of substantially similar rays. One or more of the groups of substantially similar rays are processed substantially simultaneously to produce a first a second rendered view of the computer-generated scene. The first the second rendered view are output to one or more display devices.

16 Claims, 3 Drawing Sheets

(56) References Cited

U.S. PATENT DOCUMENTS

2019/0094981 A1\* 3/2019 Bradski .............. G02B 27/0093
2020/0202288 A1\* 6/2020 Buibas ..................... G01B 7/18
2020/0225743 A1\* 7/2020 Linden ..................... G06T 7/75

OTHER PUBLICATIONS

Es et al., "GPU Based Real Time Stereoscopic Ray Tracing" (Year: 2007).\*

\* cited by examiner

DYNAMIC STEREOSCOPIC RENDERING METHOD AND PROCESSOR

BACKGROUND OF THE INVENTION

Field of the Invention

The present invention relates to methods and processors for rendering. The disclosure has particular, but not exclusive relevance to ray tracing for stereoscopic rendering.

Description of the Related Technology

In known graphics processing systems, processor, such as a graphics processing unit (GPU) can render two separate images to depict a stereoscopic three-dimensional scene. One image is for the left eye of a viewer of the scene and the other is for the right eye of the viewer. Each of the images depicts the scene from a slightly different camera position. This allows the user to reconstruct a three-dimensional image or scene from the two-dimensional images.

In some known graphics processing systems, the graphics processing is conducted separately for each eye, and some graphics processing that could be conducted sequentially for each eye is parallelized so that it is conducted concurrently for both eyes.

There remains however scope for improvements to such methods and processors.

SUMMARY

According to a first aspect of the present invention, there is provided a method comprising the steps of generating at least a first representation and a second representation, where the first representation represents a first view of a computer-generated scene obtained from a first virtual camera and the second representation represents a second view of the computer-generated scene obtained from a second virtual camera, and each of the first representation and the second representation comprises a plurality of rays which intersect with objects of the scene; determining a relationship between at least one ray of the first representation and at least one ray of the second representation; grouping the at least one ray of the first representation and the at least one ray of the second representation based on the relationship, to form a group of substantially similar rays; processing one or more of the group of substantially similar rays, substantially simultaneously to produce a first rendered view and a second rendered view of the computer-generated scene; and outputting the first rendered view and the second rendered view to one or more display devices.

According to a second aspect of the present invention, there is provided a processor comprising an input module for receiving an input from at least a first virtual camera and a second virtual camera arranged to obtain at least a first view and a second view of a computer-generated scene; a generation module for generating a first representation representative of the first view based on the input from the first virtual camera and a second representation of the second view based on the input from the second virtual camera, the first representation and the second representation comprising a plurality of rays which intersect with objects of the scene; a relationship determination module for determining a relationship between at least one ray of the first representation and at least one ray of the second representation; a grouping module arranged to group at least one ray of the first representation and the at least one ray of the second representation based on the relationship, to form a group of rays; a processing module arranged to process one or more of the group of rays, substantially simultaneously to produce a first rendered view and a second rendered view of the computer-generated scene; an output module arranged to output the first rendered view and the second rendered view to one or more display devices.

According to a third aspect of the present invention, there is provided a non-transitory computer-readable storage medium comprising a set of computer-readable instructions stored thereon which, when executed by at least one processor, cause the at least one processor to: generate at least a first representation and a second representation, where the first representation and second representation represents a first view of a computer-generated scene obtained from a first virtual camera and the second representation represents a second view of the computer-generated scene obtained from a second virtual camera, and each of the first representation and the second representation comprises a plurality of rays which intersect with objects of the scene; determine a relationship between at least one ray of the first representation and at least one ray of the second representation; group the at least one ray of the first representation and the at least one ray of the second representation based on the relationship, to form a group of substantially similar rays; process one or more of the group of substantially similar rays, substantially simultaneously to produce a first rendered view and a second rendered view of the computer-generated scene; and output the first rendered view and the second rendered view to one or more display devices.

BRIEF DESCRIPTION OF THE DRAWINGS

Further features and advantages will become apparent from the following description of preferred embodiments, given by way of example only, which is made with reference to the accompanying drawings in which like reference numerals are used to denote like features.

DETAILED DESCRIPTION OF CERTAIN INVENTIVE EMBODIMENTS

Figure 1:
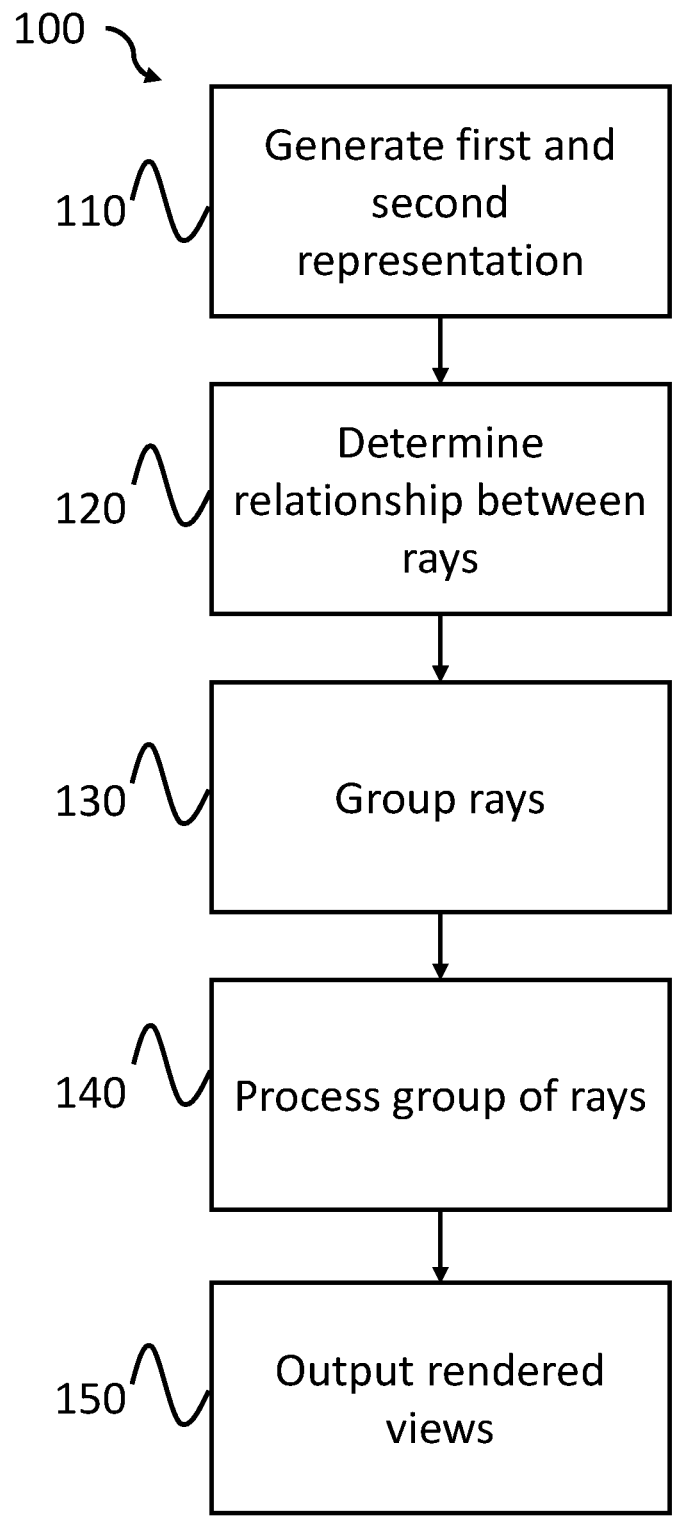
FIG. 1 is a flow diagram illustrating a method according to an example.

Details of methods and processors according to examples will become apparent from the following description with reference to the Figures. In this description for the purposes of explanation, numerous specific details of certain examples are set forth. Reference in the specification to 'an example' or similar language means that a feature, structure, or characteristic described in connection with the example is included in at least that one example, but not necessarily in other examples. It should be further noted that certain examples are described schematically with certain features omitted and/or necessarily simplified for the ease of explanation and understanding of the concepts of the examples.

Stereoscopic three-dimensional ('3D') imaging, involves providing an image to both the left eye and right eye of a viewer. As such, when a scene is computer-generated, separate images are required to be rendered for display to the left and right eye of the viewer. Rendering such scenes may be both time consuming and resource-intensive, and there exist a number of optimizations which can reduce the computational intensity of the rendered images, however these optimizations often sacrifice quality. Such optimizations include exploiting similarities between both the left-eye image and right-eye image, as well as differences introduced due to differing points of view. One of the main computationally intense operations involves realistically lighting a computer-generated scene. This is commonly achieved using one of two methods, rasterization or ray tracing. Ray tracing is a computationally expensive operation, and produces a high-quality output, whereas rasterization is much less computationally expensive, but produces, overall a lower-quality output when compared to the output of ray tracing.

Certain applications require a high-quality output, such as augmented reality ('AR'), as it is necessary to ensure physically accurate lighting conditions so that virtual objects look realistic in the physical scene. AR mixes virtual objects naturally and realistically in a physical scene. Therefore, the virtual objects must be lit correctly, as if they were located in the physical scene, and interact with physical objects in the scene. For example, if a physical object were to go in front of a virtual object, the virtual object would be occluded in some way. This requires the physical environment to be scanned which results in complex geometry. Ray tracing performs well in such situations and is able to deal with such complexities with a manageable computing overhead, whilst providing physically accurate lighting. Furthermore, accurately rendering complex geometry is not possible at high quality using rasterization. Therefore, it is preferable to use ray tracing which enables accurate reflections, refractions and shadows to be rendered, as well as realistic lens models to be employed thereby ensuring more accurate and realistic outputs.

When rendering an output using ray tracing, the computer-generated scene is represented in an acceleration data structure, which is used to determine which rays intersect with an object of the computer-generated scene. The acceleration data structure stores information about the objects in the scene based on a 'world camera' view as opposed to a model or camera view. This means that the same acceleration data structure may be used for any camera view. Furthermore, to correctly light virtual objects in a physical scene, the acceleration data structure may also hold representations of both the virtual and physical objects. As such, in the case of producing a 3D output, a single acceleration data structure is used for both the left and right eyes. When using ray tracing traversing the geometry to determine which objects within the scene interact with a particular ray is inefficient without acceleration structure due to the size of the geometry, and the poor locality of data within it. This poor locality results in an increase in the amount of power and resources required due to an increased number of memory accesses. Grouping rays together that have a similar start point and direction can improve the memory locality. This is in contrast to rasterization where the view for the left and right eyes must stream twice the full geometry, however, these are much less complex and therefore traversal of the separate acceleration data structures is much less computationally expensive and less time-consuming.

FIG. 1 is a flow diagram 100 illustrating a method for rendering a first and second view of a computer-generated scene according to an example. The first and second views may be representative of a view for the left eye of a viewer and a view for the right eye of the viewer, and as such represent a snapshot of the computer-generated scene from different locations. The different locations are representative of a viewer's eyes, and as such, in some examples may be separated by a distance similar to an interocular distance of the viewer. It will be appreciated, however, that the relative distances between the two views may be different, and may in some examples be taken at different times. At item 110, a first and second representation of the computer-generated scene are generated. The first and second representations are indicative of the first and second views to be outputted by the method. It will be appreciated that in some examples, such as a multiview or 3D holographic output, it will be desirable to have more than two views. As such, in those examples, it may be necessary to generate more than two representations. The first and second representation, as will be described in further detail below with regards to FIGS. 2a and 2b, comprise a plurality of rays being emitted from the view location representative of the camera/eye position of the viewer, and/or from an object within the computer-generated scene. Furthermore, an AR device, such as an AR headset may support eye tracking so that it is able to determine where in a scene a user is focused based, for example, on the user's vergence, interest in the scene and pupil dilation. Each of the rays is used to render the image and requires a plurality of calculations to be undertaken to ensure the processing of the rays results in a view representative of the computer-generated scene. In some examples, the representations may be optimized based on a foveated rendering method. For example, in an AR/VR scenario, the method may track a viewer's eye position, and cast more rays in the fovea region than in the peripheral region. This results in the majority of the computation occurring in relation to rays which fall within the fovea region than in the periphery of the viewer's field of view. Furthermore, since performing the calculations for each of the rays is computationally intensive and time-consuming, this optimizes the output produced. It will be appreciated that other optimizations may be used, in particular in the periphery of the field of view, such as rasterizing the periphery region, only ray tracing for a single perspective or using half the interocular distance. To do this, once the representations have been generated, the method proceeds to item 120, where a relationship between one or more rays of the two views is determined.

At item 120, one or more relationships between the rays of the first and second representation may be determined. This may be achieved using a variety of methods including determine which rays are likely to hit the same object within the computer-generated scene and using one or more characteristics associated with the rays to determine whether there is a relationship. For example, a relationship may be determined between two or more rays if there is an overlap in the output view, that is the representation of the computer-generated scene to be rendered, and the ray from the first representation and the ray from the second representation both intersect an object within the overlapping portion of the computer-generated scene. The overlapping rays in the output view are representative of the binocular overlap region associated with the view, the amount of which may be based on the viewer's interocular distance. This is typically 120 degrees horizontally, and as such can cover a total of approximately 75% of the visual field of a viewer.

The one or more characteristics associated with the rays may include but are not limited to, the start point of the ray, and the direction of the ray. These, in combination with the interocular distance, vergence, distance between the two cameras can be used to determine if there is a relationship between the rays, or the depth of an object in the scene. Where the depth of an object in the scene is used this information may be obtained using a less computationally expensive method. Furthermore, in some examples, a user's eyes may rotate to ensure focus on a particular object, or group of objects, within the scene, therefore when rendering images for the left and right eyes, the interocular distance may not be parallel to the view of the scene.

In some examples, the relationship between the rays may be used to optimize the processing of the related rays, as will be described below with reference to FIGS. 2a and 2b, such as when two rays are substantially are likely to follow a similar path and likely to intersect the same object. In such a case, the processing of one ray may be used to determine the other ray by applying an operation, such as a translation. This results in an optimization of the acceleration data structure lookup by improving the locality. Furthermore, where the rays hit the same object, the material shader locality may also be improved. Rays which the same object may be determined to be related, and it is, therefore, possible for them to be computed simultaneously, increasing the locality of the acceleration data structure traversal. When determining the relationship, the distance from the cameras to an object in the computer-generated scene, the vergence, differing camera angles may also be considered. One such example of this may be to use determine depth information for the one or more objects within the computer-generated scene and determine the vergence of the cameras. This may be determined by using a separate, computationally inexpensive operation, such as rasterization, or a previously determined intersect which may in some examples have been generated in a previous iteration using a ray-tracing operation and stored in a buffer. In some examples, the vergence may be already known due to one or more properties of the display device. By first determining depth information for each of the objects within the scene using rasterization, a first intersect can be determined which can further aid in determining a relationship between two or more rays, especially when those rays are cast from the object, such as in hybrid ray tracing. Hybrid ray tracing makes use of both rasterization and ray tracing techniques to perform physically accurate rendering. Typically, deferred rasterization is performed with the results being written to memory, such as a g-buffer. The g-buffer contains information for each pixel, for example indicating the color, depth, texture, and surface normal, amongst other properties. This provides ray tracing first intersect information in a significantly more efficient manner in comparison to a standard ray tracing approach. For example, a relationship may be determined to exist between two rays if they interested at the same point on the first intersect. This has the effect of further increasing traversal locality.

Once the one or more relationships have been determined between the rays of the different representations, the rays are grouped at item 130. The grouping of the rays enables substantially similar rays to be processed together, thereby increasing acceleration data structure traversal locality, improving the efficiency of ray tracing and reducing computational requirements. For example, where a ray of the first representation has a direction similar to that of a ray in the second representation, and a substantially similar start point, then these may be grouped together.

Following the grouping of rays based on the relationships, the groups of rays may be processed at item 140. The processing of the groups of rays is undertaken in such a way that substantially similar rays are processed together thereby increasing acceleration data structure traversal locality, and as such the efficiency by reducing the number of memory accesses. This, in turn, reduces power and resource usage. This is particularly important on mobile devices where the battery capacity of the device is limited. To further increase efficiency, the location of the viewer's gaze may be determined, and ray tracing processes may only be undertaken in this fovea region. The remaining periphery region may then be rendered using a rasterization technique, providing a more detailed and accurate rendering in the viewer's focal range, and a less detailed rendering in the viewer's periphery, thereby increasing the efficiency of the method further.

The processing of the ray produces a first rendered view representative of the first view of the computer-generated scene as seen from a first camera or viewer position, and a second rendered view representative of the second view of the computer-generated scene as seen from a second camera or viewer position.

Once the first and second rendered view have been produced, they are outputted to one or more display devices at item 150. The one or more display devices may each comprise one or more displays for outputting the rendered views. For example, the display device may be a head-mounted display which comprises two separate displays, one for the left eye of the viewer and one for the right eye of the viewer, such that the first rendered view is sent to the left eye display and the second rendered view is sent to the right eye display. In another example, the display device may be a stereoscopic display such that a frame of the first rendered view and a frame of the second rendered view are displayed in an interlaced manner. Other displays devices may also include a multiview display or holographic display capable of displaying multiple rendered views. It will be appreciated that the invention is not just limited to generating first and second representations of a computer-generated scene, but maybe capable of generating more than two representations, and outputting corresponding views of said representations to the display device. In some examples, where the rendered scenes are arranged to be output to a multiview display the method may be capable of generating multiple representations from multiple computer-generated scenes, for display to different viewers based on their viewing angle relative to the multiview display.

Figure 2A:
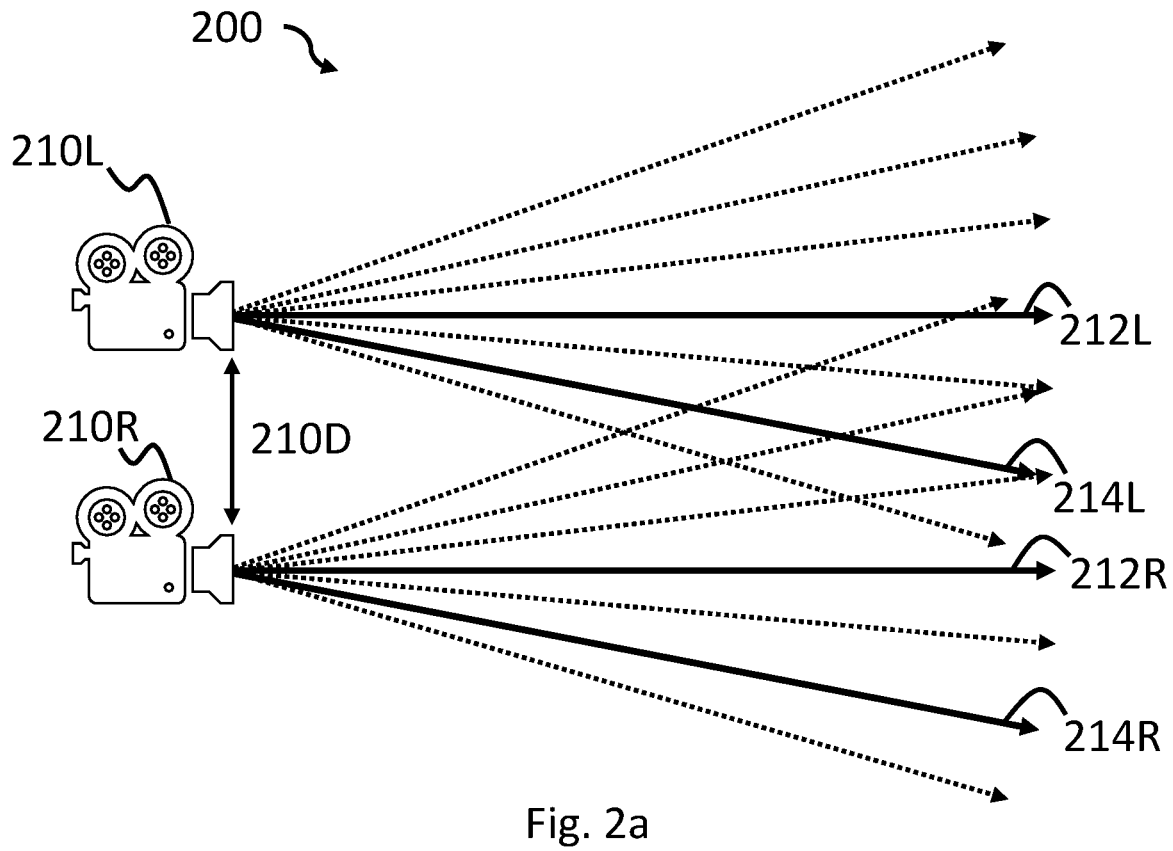
FIG. 2a shows schematically the determination of a relationship between a plurality of rays according to a first example.

FIG. 2a shows schematically a representation 200 of the determination of a relationship between a plurality of rays according to a first example. The representation 200 comprises two cameras, a first camera 210L representing the left eye of a viewer, and a second camera 210R representing the right eye of a viewer. The first camera 210L and the second camera 210R are positioned within the computer-generated scene separated by a distance 210D representative of the interocular distance of the viewer. The distance 210D may be customizable based on the viewer's preferences and/or hardware requirements of a display device on which the rendered output is to be displayed. Furthermore, the distance 210D may be adjusted to any appropriate value to provide views from different scales within the environment, to provide different effects, such as magnification. It will be appreciated that a representation may comprise more than two cameras, such as when the method described above in relation to FIG. 1 is arranged to generate more than two views of a computer-generated scene. When rendering the first view of the computer-generated scene a plurality of rays is emitted from the first camera 210L position. The plurality of rays includes rays in a number of directions arranged to intersect with a number of objects within the computer-generated scene, such as ray 212L and ray 214L. Similarly, when rendering the second view of the computer-generated scene, a plurality of rays is emitted from the second camera 210R position. The plurality of rays also includes rays in a number of directions arranged to intersect with objects within the computer-generated scene, such as ray 212R and ray 214R.

In the representation 200 of FIG. 2a, there is no vergence present, that is the first camera 210L and the second cameral 210R are fixed in position, parallel, and do not alter their view. If a user device, such as an AR/VR headset supports eye tracking, the user's vergence, if any, can be determined and used when generating the virtual objects. In such an example, it is possible to determine whether there is a relationship between two or more rays, and to subsequently group said rays together since the related rays have a substantially similar direction. For example, ray 212L and ray 212R have the same direction, however start from a different position. That is, ray 212L starts from the first camera 210L and ray 212R starts from the second camera 210R. As such, ray 212L and ray 212R may be said to be related if it is determined that they intersect with an object within the computer-generated scene. Similarly, ray 214L and ray 214R may be related as they too have a substantially similar direction. If, for example ray 214L and 214R do not intersect the same object in the computer-generated scene then they may not be related. If a relationship is determined, it is possible to render only one of the related rays, such as ray 212L or 214L, and then, based on the processed ray, process the complementary ray 212R or 214R as an offset of the first ray 212L or 214L. Even if the rays do not intersect the same object, a portion of the traversal information cached in the system in relation to the first ray 212L maybe common and reused, during calculation of the second ray 214L, thereby reducing the computational bandwidth and power. In one example, the offset may be indicative of the interocular distance, that being the distance 210D between the first camera 210L and the second camera 210R. This improves the efficiency by reducing the accelerated data structure traversal locality when generating the first rendered view from the first camera 210L and the second rendered view from the second camera 210R.

Figure 2B:
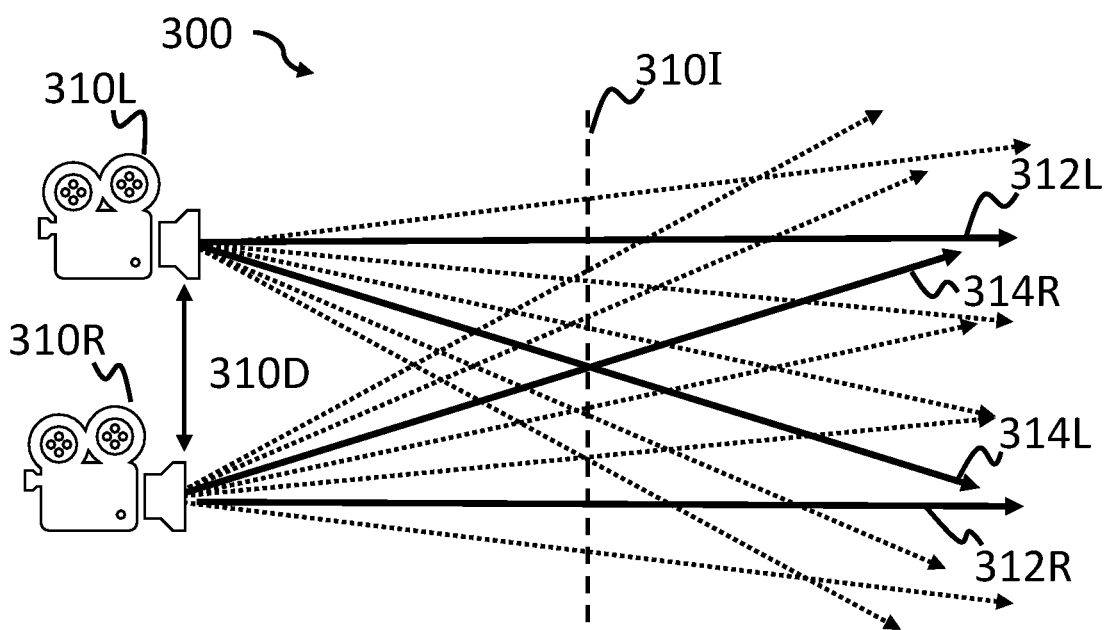
FIG. 2b shows schematically the determination of a relationship between a plurality of rays according to a second example.

FIG. 2b shows schematically a representation 300 of the determination of a relationship between a plurality of rays according to a second example. The representation 300 comprises two cameras, a first camera 310L representing the left eye of a viewer, and a second camera 31oR representing the right eye of a viewer. The first camera 310L and the second camera 310R are positioned within the computer-generated scene separated by a distance 310D representative of the interocular distance of the viewer. The distance 310D may be customizable based on the viewer's preferences and/or hardware requirements of a display device on which the rendered output is to be displayed. It will be appreciated that a representation may comprise more than two cameras when the method described above in relation to FIG. 1 is arranged to generate more than two views of a computer-generated scene. When rendering the first view of the computer-generated scene a plurality of rays is emitted from the first camera 310L position. The plurality of rays includes rays in a number of directions arranged to intersect with a number of objects within the computer-generated scene, such as ray 312L and ray 314L. Similarly, when rendering the second view of the computer-generated scene, a plurality of rays is emitted from the second camera 310R position. The plurality of rays also includes rays in a number of directions arranged to intersect with objects within the computer-generated scene, such as ray 312R and ray 314R.

In the representation 300 of FIG. 2b, vergence is present, that is the first camera 310L and the second cameral 310R are fixed in position and but can alter their view, for example by pivoting on an axis. In this representation 300, ray 312L and ray 312R have substantially the same direction, and as such may be determined to be related if they intersect the same object. As such, ray 312L and 312R may be processed at substantially the same time, thereby minimising the accelerated data structure traversal locality.

In another example, where hybrid ray tracing is used, or where a first intersect is computed, rays may be grouped together from the left camera and the right camera based on whether they intersect at the same point on the first intersect. The first intersect may be calculated to be positioned within the field of view of the viewer, for example at the position 3101 as shown in representation 300. In such an example, rays, such as ray 314L and 314R, which intersect at the same point on the first intersect may also be determined to have a relationship and as such may be grouped together, further increasing locality.

Figure 3A:
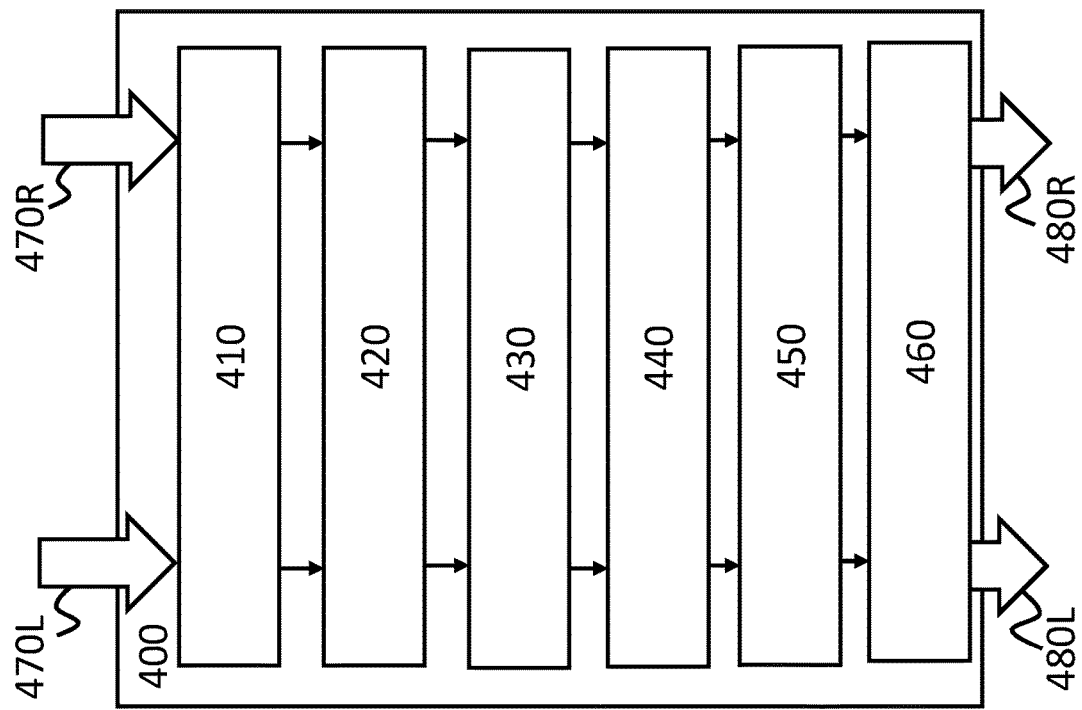
FIG. 3a shows schematically a processor according to a first example.

FIG. 3a shows schematically a processor 400 according to a first example. The processor may be a graphics processing unit (GPU) arranged to process and render computer-generated scenes from an application running on an associated system. The processor 400 is arranged to process both a first view 470L and a second view 470R substantially in parallel. In such an example, the first view 470L may be representative of the view for output on a display for the left eye of a viewer, and the second view 470R may be representative of the view for output on a display for the right eye of the viewer. The processor 400 may be used when it is required to have two or more views generated in parallel, such as for output to a head-mounted display with separate displays for the left and the right eye.

It will be appreciated that whilst the processor 400 of FIG. 3a is shown to receive two inputs 470L, 470R, the processor 400 may be arranged to receive more than two inputs and produce more than two outputs.

The processor 400 comprises an input module 410 arranged to receive an input 470L from a first virtual camera representative of a first view of a computer-generated scene. The input module 410 is also arranged to receive an input 470R from a second virtual camera representative of a second view of a computer-generated scene. The first and second views of the computer-generated scene may represent the computer-generated scene at substantially the same time, however, it will be appreciated that the first and second views may represent the computer-generated scene at a different time. Similarly, the first and second views of the computer-generated scene need not represent the same computer-generated scene. When processing inputs for use in a multiview display, for example, the first view may be representative of a view of a first computer-generated scene, and the second view may be representative of a view of a second computer-generated scene, such that the multiview display is able to display both the first and second computer-generated scenes to different viewers, based on the viewer's location relative to the multiview display.

Once the inputs 470L, 470R have been received, they are passed to the generation module 420 where a first representation and a second representation of the corresponding inputs 470L, 470R are produced. The first and second representations comprise a plurality of rays which intersect with objects of the computer-generated scene. Once the plurality of rays have been generated, a relationship determination module 430 determines one or more relationships between the generated rays.

The relationship determination module 430 determines the relationship between the rays and optimizes the processing of the related rays, as described above with reference to FIGS. 2*a* and 2*b*. For example, when two rays follow substantially similar paths and preferably, intersect the same objects, the processing of one ray may be used to determine the other ray by applying an operation, such as a translation. This enables an optimization of the acceleration data structure lookup by improving locality and in examples where the rays intersect the same object, the material shader locality can also be improved. Furthermore, rays which fall within the overlapping regions of the first and second representation may be determined to be related, as it is possible for them to be computed simultaneously thereby increasing acceleration data structure traversal locality. When determining the relationship, the distance from the cameras to an object in the computer-generated scene, and vergence or differing camera angles may also be considered. One such example of this may be to use determine depth information for the one or more objects within the computer-generated scene and to determine the vergence of the cameras. A separate, computationally inexpensive operation, such as rasterization, or a previously determined intersect generated in a previous iteration using a ray-tracing operation and which has been stored in memory may also be considered. In some examples, the vergence may be already known due to one or more properties of the display device. The first intersect, which may be determined via hybrid ray tracing and stored in a g-buffer containing properties of individual pixels, can further aid in determining a relationship between two or more rays, especially when those rays are cast from an object, such as in hybrid ray tracing. For example, a relationship may be determined to exist between two rays if they intersect at the same point on the first intersect. This has the effect of further increasing traversal locality.

Once a relationship has been determined between the rays of the first representation and the second representation, a grouping module 440 is arranged to group the related rays. Following the grouping, a processing module 450 processes the groups of rays such that a first rendered view and a second rendered view are produced. As mentioned above, the processing of the related rays results in an improved locality when traversing the accelerated data structure.

Following the production of the first rendered view and the second rendered view an output module 460 outputs the first rendered view 480L and second rendered view 480R to a display device, such as a head-mounted display, or a multiview display. The display device may comprise multiple displays such that each of the rendered views 480L, 480R is output to a different display of the display device.

Figure 3B:
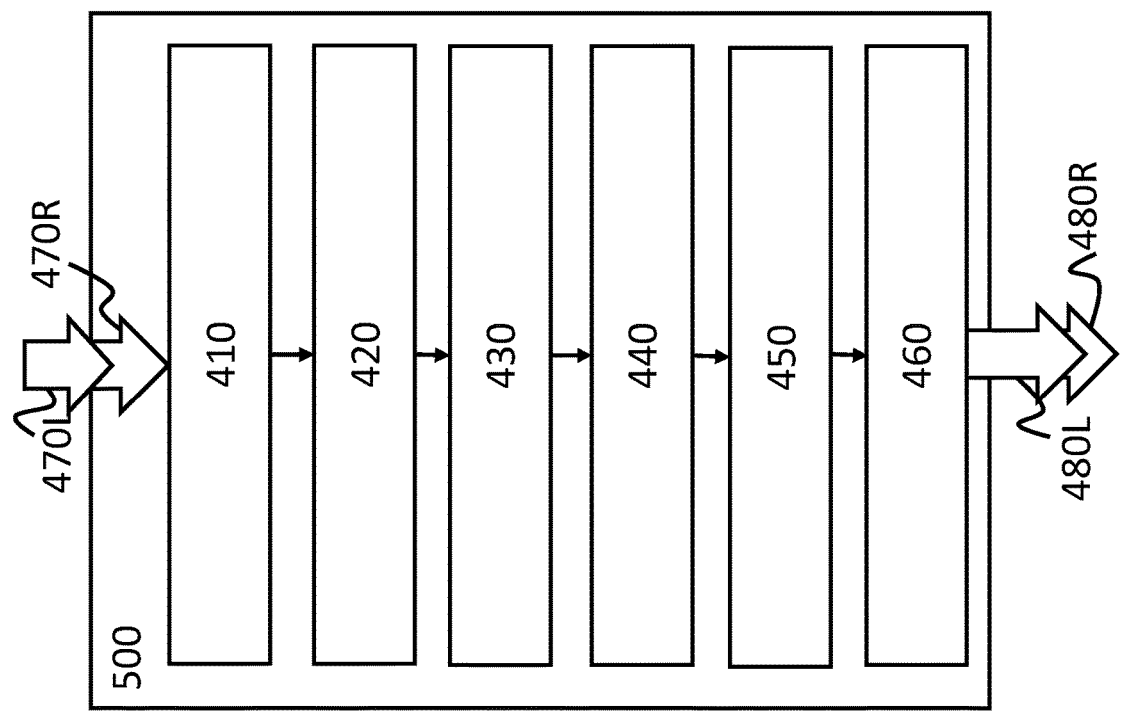
FIG. 3b shows schematically a processor according to a second example.

FIG. 3*b* shows schematically a processor 500 according to a second example. The processor may be a graphics processing unit (GPU) arranged to process and render computer-generated scenes from an application running on an associated system. The processor 500 is arranged to process a first view 470L and a second view 470R consecutively. In such an example, the first view 470L may be representative of the view for the left eye of a viewer, and the second view 470R may be representative of the view for the right eye of the viewer. The processor 500 may be used when it is not required to have two or more views generated in parallel, such as for output to a stereoscopic display where the view for the left eye and the view for the right eye are interlaced.

The processor 500 comprises the same modules as the processor 400 described above in relation to FIG. 3*b*.

In some examples, it will be appreciated that the processor 400, 500 may be arranged to switch between modes, that is the processor may be arranged to process inputs in parallel and consecutively depending upon the type of display device the rendered views 480L, 480R are to be displayed on. In yet a further example, the rendered views 480L, 480R may be output to a buffer or external storage (not shown). The storage may comprise a main memory, otherwise referred to as a 'primary memory'. For example, storage may comprise 'off-chip' memory or 'on-chip' memory. The storage may, for example, comprise a magnetic or optical disk and disk drive or a solid-state drive (SSD), or non-volatile RAM (NVRAM). In some examples, the storage comprises a synchronous dynamic random-access memory (SDRAM). For example, the storage may comprise a double data rate synchronous dynamic random-access memory (DDR-SDRAM). In such an example, the rendered view 480L, 480R may be retrieved from the buffer or storage for use in processing subsequent frames in a sequence, such as when determining the first intersect 3101 as described above in relation to FIG. 2*b*.

In some examples the processor 400, 500 may also comprise a target region identification module for determining the location of a viewer's gaze, and adjusting the type of processing applied to the inputs 470L, 470R accordingly. For example, where the target region identification module indicates that a view is focusing, more rays may be rendered, and a less computationally expensive method may be used to generate rendered views for the periphery of the viewer's field of view.

The above examples are to be understood as illustrative examples of the present disclosure. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A method comprising the steps of:
   identifying at least one target region of a computer-generated scene, the at least one target region being associated with data relating to a gaze direction of a viewer;
   generating at least a first computer-generated representation and a second computer-generated representation, where the first computer-generated representation represents a first view of the computer-generated scene obtained from a first virtual camera and the second computer-generated representation represents a second view of the computer-generated scene obtained from a second virtual camera, and each of the first computer-generated representation and the second computer-generated representation comprises a plurality of rays which intersect with objects of the computer-generated scene, wherein the first virtual camera and the second virtual camera are positioned within the computer-generated scene so as to represent an interocular distance associated with the viewer, and wherein generating at least the first computer-generated representation and the second computer-generated representation comprises:

increasing the number of rays in the first view and the second view, arranged to intersect with objects in the target region of the computer-generated scene; and decreasing the number of rays in the first view and the second view arranged to intersect with objects outside the target region of the computer-generated scene;

determining a relationship between at least one ray of the first computer-generated representation and at least one ray of the second computer-generated representation;

grouping the at least one ray of the first computer-generated representation and the at least one ray of the second computer-generated representation based on the relationship, to form a group of substantially similar rays;

processing one or more of the group of substantially similar rays, substantially simultaneously to produce a first rendered view and a second rendered view of the computer-generated scene, wherein the first rendered view and the second rendered view are rendered using a first rendering technique in the target region and a second rendering technique outside the target region; and outputting the first rendered view and the second rendered view to one or more display devices.

2. The method of claim 1, wherein determining the relationship comprises determining whether a ray of the first computer-generated representation and a ray of the second computer-generated representation intersect an object in the computer-generated scene.

3. The method of claim 2, wherein determining whether a ray of the first computer-generated representation and a ray of the second computer-generated representation intersect an object in the computer-generated scene, is based on at least:

a start point and a direction of each of the ray of the first computer-generated representation and the ray of the second computer-generated representation; and a distance between the first virtual camera and the second virtual camera.

4. The method of claim 2, wherein determining the relationship is also based on an intersect between the ray of the first computer-generated representation and the ray of the second computer-generated representation.

5. The method of claim 4, wherein the intersect is determined using at least one of rasterization or ray tracing.

6. The method of claim 2, where the ray of the first computer-generated representation and the ray of the second computer-generated representation have a substantially similar direction, and wherein processing the ray of the second computer-generated representation comprises processing the ray of the first computer-generated representation and applying an offset associated with a distance between the first virtual camera and the second virtual camera.

7. The method of claim 1, wherein the first rendering technique and the second rendering technique are at least one of rasterization; or ray tracing.

8. The method of claim 1, wherein the data relating to the gaze direction of a viewer comprises eye-tracking data.

9. The method of claim 1, wherein the one or more display devices comprises at least one of a head-mounted display; a stereoscopic display, a multiview display, and a holographic display.

10. A processor comprising:

an input module for receiving an input from at least a first virtual camera and a second virtual camera arranged to obtain at least a first view and a second view of a computer-generated scene, wherein the first virtual camera and the second virtual camera are positioned within the computer-generated scene so as to represent an interocular distance associated with the viewer;

a target region identification module arranged to identify at least one target region of the computer-generated scene, the at least one target region being associated with a gaze direction of a viewer;

a generation module for generating a first computer-generated representation representative of the first view based on the input from the first virtual camera and a second computer-generated representation of the second view based on the input from the second virtual camera, the first computer-generated representation and the second computer-generated representation comprising a plurality of rays which intersect with objects of the scene, wherein generating the first computer-generated representation and second computer-generated representation comprises:

increasing the number of rays in the first view and the second view, arranged to intersect with objects in the target region of the computer-generated scene; and decreasing the number of rays in the first view and the second view arranged to intersect with objects outside the target region of the computer-generated scene;

a relationship determination module for determining a relationship between at least one ray of the first computer-generated representation and at least one ray of the second computer-generated representation;

a grouping module arranged to group at least one ray of the first computer-generated representation and the at least one ray of the second computer-generated representation based on the relationship, to form a group of rays;

a processing module arranged to process one or more of the group of rays, substantially simultaneously to produce a first rendered view and a second rendered view of the computer-generated scene, wherein the first rendered view and the second rendered view are rendered using a first rendering technique in the target region and a second rendering technique outside the target region; and an output module arranged to output the first rendered view and the second rendered view to one or more display devices.

11. The processor of claim 10, wherein the relationship determination module comprises an intersection detection module for determining whether a ray of the first computer-generated representation and a ray of the second computer-generated representation intersect an object in the computer-generated scene.

12. The processor of claim 11, wherein determining whether a ray of the first computer-generated representation and a ray of the second computer-generated representation intersect and object in the computer-generated scene, is based on at least:

a start point and a direction of each of the ray of the first computer-generated representation and the ray of the second computer-generated representation; and a distance between the first virtual camera and the second virtual camera.

13. The processor of claim 11, wherein the intersection detection module is arranged to determine an intersect between the ray of the first computer-generated representation and the second computer-generated representation.

14. The processor of claim 10, wherein the target region identification module comprises an eye-tracking sensor arranged to track at least one eye of the viewer.

15. The processor of claim 10, wherein the one or more display devices comprises at least one of a head-mounted display; a stereoscopic display, a multiview display, and a holographic display.

16. A non-transitory computer-readable storage medium comprising a set of computer-readable instructions stored thereon which, when executed by at least one processor, cause the at least one processor to:
identify at least one target region of a computer-generated scene, the at least one target region being associated with data relating to a gaze direction of a viewer;
generate at least a first computer-generated representation and a second computer-generated representation, where the first computer-generated representation represents a first view of the computer-generated scene obtained from a first virtual camera and the second computer-generated representation represents a second view of the computer-generated scene obtained from a second virtual camera, and each of the first computer-generated representation and the second computer-generated representation comprises a plurality of rays which intersect with objects of the computer-generated scene, wherein the first virtual camera and the second virtual camera are positioned within the computer-generated scene so as to represent an interocular distance associated with the viewer, and wherein generating at least the first representation and the second representation comprises:
increasing the number of rays in the first view and the second view, arranged to intersect with objects in the target region of the computer-generated scene; and
decreasing the number of rays in the first view and the second view arranged to intersect with objects outside the target region of the computer-generated scene;
determine a relationship between at least one ray of the first computer-generated representation and at least one ray of the computer-generated second representation;
group the at least one ray of the first computer-generated representation and the at least one ray of the second computer-generated representation based on the relationship, to form a group of substantially similar rays;
process one or more of the group of substantially similar rays, substantially simultaneously to produce a first rendered view and a second rendered view of the computer-generated scene, wherein the first rendered view and the second rendered view are rendered using a first rendering technique in the target region and a second rendering technique outside the target region; and
output the first rendered view and the second rendered view to one or more display devices.

* * * * *